United States Patent Office.

THOMAS M. FELL AND AMBROSE G. FELL, OF BROOKLYN, NEW YORK, ASSIGNORS TO THEMSELVES AND WILLIAM BELL, OF NEW YORK, N. Y.

Letters Patent No. 66,139, dated June 25, 1867; antedated April 11, 1867.

IMPROVEMENT IN THE MANUFACTURE OF WHITE LEAD.

The Schedule referred to in these Letters Patent and making part of the same.

TO ALL WHOM IT MAY CONCERN:

Be it known that we, THOMAS M. FELL and AMBROSE G. FELL, both of the city of Brooklyn, in the State of New York, have invented certain new and useful improvements in the Manufacture of White Lead; and do hereby declare the following to be a full, clear, and exact description thereof.

Our present improvements consist in treating the chloride or oxychloride of lead in the manner hereinafter described, thereby producing a superior white lead to be used as a pigment.

Chloride of sodium when boiled or heated and well mixed and ground with oxide of lead, such oxide being either common litharge, calcined ores, or other substance containing a large proportion of oxide, forms, in the course of a few hours, a perfect combination producing a chloride or oxychloride of lead, such as is described and claimed by us in a patent bearing even date herewith.

We find, as therein stated, that twenty per centum of common chloride of sodium of a good quality is about the right proportion. A considerably greater percentage than this gives the chloride, after a further treatment, a dark color, while a much less has a similar effect. But this last-named substance, without the further treatment hereinafter mentioned, is not well adapted for the purpose of a pigment, being of an impure color and partially soluble by the action of water. We consequently convert this chloride or oxychloride of lead into a chlorosulphate or white lead, which is pure white in color, possesses a fine body, and is insoluble when mixed as a pigment. To obtain this result we submit the chloride or oxychloride to an intimate contact with about forty per centum of sulphuric acid of 60° in lead-lined, glass, porcelain, or other suitable vessels, at a temperature approaching the boiling point. This branch of the process requires great care, and as the acid produces a powerful and quick action on the chloride it should be added in small quantities, from time to time, during a period say from two to three hours from the commencement, until it is all put in. The mass then requires digesting for several hours.

To enable others to practise our invention we will give the details of its working on a large scale.

We first dissolve four hundred pounds of the best quality of common salt, as free as possible from impurities, in sufficient water to take up the same. Next, two thousand pounds of oxide of lead is well ground and stirred in a large vessel or mill, and mixed with enough water to form a thin paste; then this paste is boiled or heated to a high temperature. The salt solution being also made hot and drained off from its impurities, is now gradually added to the last-named mixture in said vessel, which is lined with lead, and constructed with a muller or stirrer so that the material will be well mixed or ground. Owing to the powerful and quick combination the mass becomes occasionally very stiff, which must be counteracted by thorough stirring and grinding, and by the addition of small quantities of water from time to time. We usually occupy, in mixing, from about two to three hours, and then let the mass cool off and digest for from five to six hours, or more, until perfect combination ensues. Instead of making it into a solution the salt, if known to be pure, can be simply added to the mixture of oxide, and the whole well stirred or ground, and so forth, as before stated; but we prefer a solution, as most salt contains more or less impurities.

The contents of the vessel are now a chloride or oxychloride of lead, and a clear solution of soda derived from the chloride of sodium. This solution is now drawn off as an article of commerce, and the chloride is well washed by water until every remaining trace of caustic soda is removed; after which it is again heated to the boiling point and subjected to the action of sulphuric acid, which is added in small quantities in manner as hereinbefore stated, the whole being then allowed to rest, cool, and digest for several hours. We have now chlorosulphate of lead, with free muriatic acid, which may be drawn off as an article of commerce. The chlorosulphate is now well washed in the same manner as practised for the removal of the caustic soda from the chloride, in order to free it from all traces of acid; then it is dried in the same manner as practised with ordinary white lead. Instead of sulphuric acid any salt of that acid, of an equivalent quantity, may be used, the result being chlorosulphate of lead and a salt, which salt can be subsequently washed out; but the use of a salt of that acid would be more expensive than the acid itself.

Having thus described our new process for producing white lead, what we claim as new, and desire to secure by Letters Patent, is—

The treatment of chloride of lead in the manner and for the purpose substantially as herein described.

THOMAS W. FELL,
AMBROSE G. FELL.

Witnesses:
ANDREW J. TODD,
THOMAS F. PHELAN.